(12) United States Patent
Ashraf et al.

(10) Patent No.: US 8,855,628 B2
(45) Date of Patent: Oct. 7, 2014

(54) CALL SETUP FOR ROAMING SUBSCRIBERS

(75) Inventors: Syed Reaz Ashraf, Sparta, NJ (US);
Behzad Davachi Mottahed, Montclair, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2213 days.

(21) Appl. No.: 11/769,063

(22) Filed: Jun. 27, 2007

(65) Prior Publication Data
US 2009/0005036 A1    Jan. 1, 2009

(51) Int. Cl.
*H04W 4/00* (2009.01)
*H04W 8/06* (2009.01)
*H04W 8/18* (2009.01)

(52) U.S. Cl.
CPC .. *H04W 8/06* (2013.01); *H04W 8/18* (2013.01)
USPC .......................... 455/433; 455/558; 455/435.1

(58) Field of Classification Search
CPC ....... H04W 92/02; H04W 40/02; H04W 4/18; H04W 4/06; H04W 4/00
USPC ...................................... 455/433, 558, 435.1
See application file for complete search history.

(56) References Cited

U.S. PATENT DOCUMENTS

2006/0205404 A1*  9/2006  Gonen et al. ............... 455/432.1

FOREIGN PATENT DOCUMENTS

| WO | 9959371 | 11/1999 |
|----|---------|---------|
| WO | 0013454 | 3/2000  |

OTHER PUBLICATIONS

International Search Report and Written Opinion of the International Searching Authority for International application No. PCT/US2008/007573 mailed Oct. 29, 2008.
International Preliminary Report on Patentability for International application No. PCT/US2008/007573 mailed Jan. 14, 2010.

* cited by examiner

*Primary Examiner* — Patrick Edouard
*Assistant Examiner* — Michael Irace
(74) *Attorney, Agent, or Firm* — Carlson, Gaskey & Olds

(57) ABSTRACT

A wireless communication assembly (20) includes a visitor location register (42) that accesses a mobile station memory portion (44) that stores a visiting mobile subscriber's profile including an indication of the wireless features available to that subscriber. When a call needs to be setup involving the visiting mobile subscriber, the visitor network locally sets up the call by using the stored indication of the visiting mobile subscriber's profile from the mobile station memory portion (44). There is no need for contacting the subscriber's home network for purposes of setting up the call, which reduces the amount of signaling and communication between the visitor network and the subscriber's home network.

4 Claims, 2 Drawing Sheets

CALL SETUP FOR ROAMING SUBSCRIBERS

FIELD OF THE INVENTION

This invention generally relates to communications. More particularly, this invention relates to wireless communications.

DESCRIPTION OF THE RELATED ART

Wireless communication systems are in widespread use. A variety of different services are available and each subscriber pays for particular features or services. Each subscriber has a contract with a provider that defines the features or capabilities available to that subscriber. Each subscriber is associated with a home network that very often facilitates communications on behalf of that subscriber.

From time to time, people desire wireless communication service in an area that is not covered by their home network. In such cases, a subscriber is considered to be roaming in a visitor network. In other words, the subscriber is a visitor to a network that is distinct from its home network. There are agreements in place between providers that allow for a roaming subscriber to obtain wireless communication coverage outside of their home network coverage area.

Handling a visiting subscriber and facilitating calls on their behalf can be a relatively cumbersome process. When a subscriber initially roams into a visitor network's coverage area, the subscriber has to be registered with a visitor location register of the visitor network. Known techniques exist for registering a visiting mobile subscriber. Registration typically involves a registration request notification that is handled through an SS7 connectivity link between the visitor location register (VLR) and a home location register (HLR) of the subscriber's home network. The registration process typically provides information to the VLR regarding the features available to that particular subscriber. If the SS7 connectivity link is down or very busy, the registration process may be delayed.

Once registered, the roaming mobile subscriber may desire to place a call or another caller may desire to reach the roaming mobile subscriber. The process for setting up a call between the roaming mobile subscriber and another caller has required an exchange of information through an SS7 connectivity link, for example, which can introduce delays and is relatively cumbersome. For example, the HLR must be contacted. A mobile switching center of the home network requires location information from the HLR. The HLR issues a route request to the VLR of the visitor network. The VLR then issues a route request return result that is provided to the HLR. This typically includes a temporary local dial number that the home network mobile switching center will use to set up the call. The home network mobile switching center then provides an initial address message, which is used to seize a circuit and transfer addressing and call handling or routing information. The initial address message is provided through the SS7 connectivity link to the VLR so that the call can be setup.

Such a call setup process can introduce delays, especially when the SS7 connectivity link is very busy or down. Such delays can be frustrating for those trying to reach the roaming mobile subscriber. It is desirable to avoid such a relatively cumbersome process for setting up a call to a roaming mobile subscriber.

SUMMARY

An exemplary method of facilitating wireless communications includes registering a visiting mobile subscriber in a visitor location register of a network. An indication of the visiting mobile subscriber profile is stored by a mobile station of the visiting mobile subscriber and includes an indication of any wireless communication features available to the visiting mobile subscriber. A call between another subscriber and the visiting mobile subscriber is locally setup by the network associated with the visitor location register by accessing the stored indication of the visiting mobile subscriber profile from the mobile station for locally setting up the call.

One advantage to such an approach is that there is no requirement for contacting the home location register to setup the call. Instead, the call setup process is completed entirely locally by the visitor network.

An exemplary wireless communications assembly includes a visitor location register configured to register a visiting mobile subscriber that is visiting a visitor network of the visitor location register. The visiting subscriber's mobile station includes a memory portion that stores an indication of the visiting mobile subscriber profile including an indication of any wireless communication features available to the visiting mobile subscriber. The visitor network is configured to locally setup a call between another mobile subscriber and the visiting mobile subscriber by accessing and using the stored indication of the visiting mobile subscriber profile from the memory portion of the mobile station.

The various features and advantages of the disclosed examples will become apparent to those skilled in the art from the following detailed description. The drawings that accompany the detailed description can be briefly described as follows.

DETAILED DESCRIPTION

Figure 1:
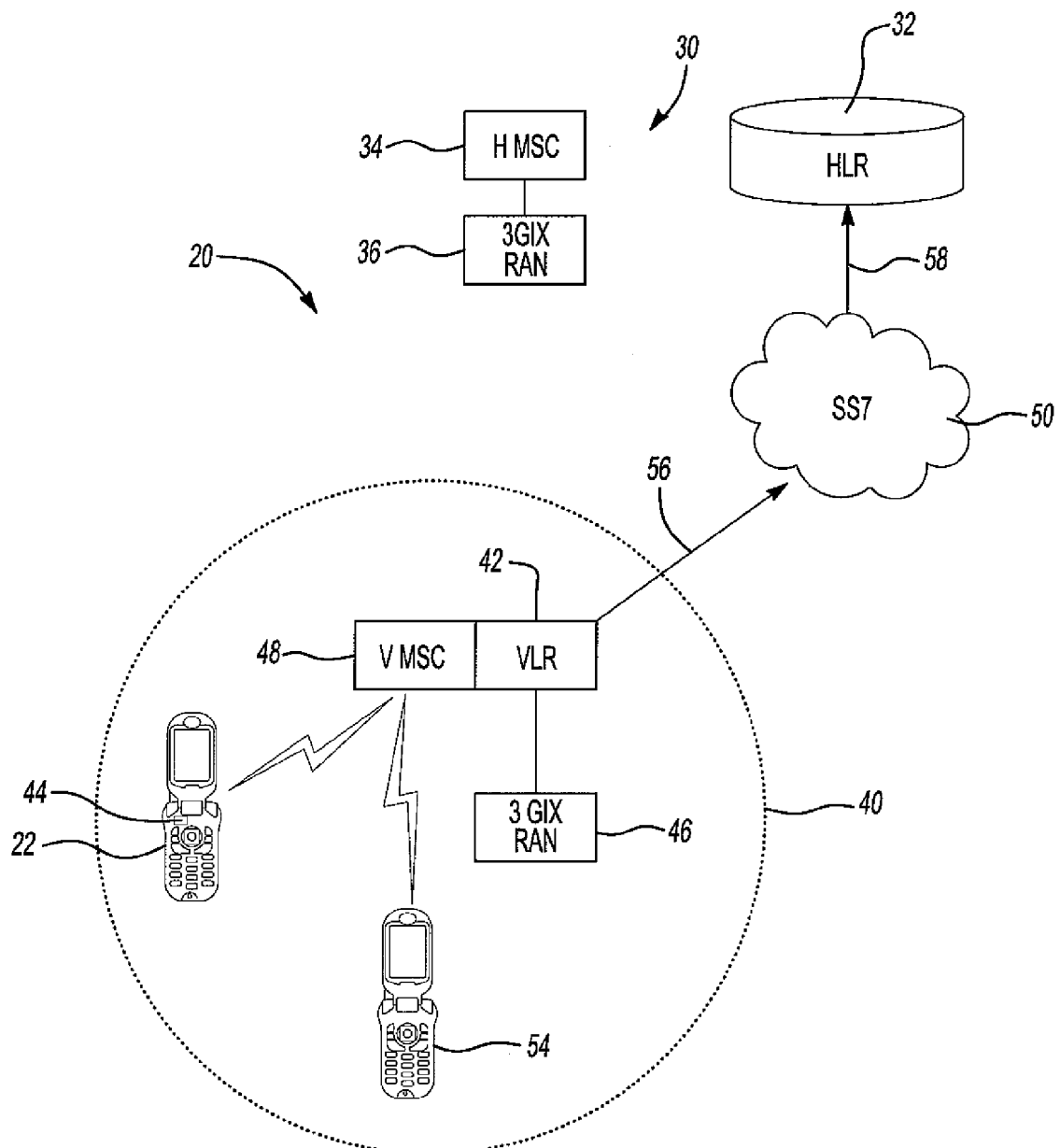
FIG. 1 schematically illustrates selected portions of a wireless communication arrangement that is useful with an embodiment of this invention.

FIG. 1 schematically shows selected portions of a wireless communication assembly 20 that allows a mobile subscriber to use a mobile station 22 to conduct a variety of types of wireless communications. In the illustrated example, the mobile subscriber 22 is a visiting mobile subscriber who is roaming outside of the coverage area provided by a home network 30 of the subscriber.

As schematically shown in FIG. 1, the home network 30 includes a home location register (HLR) 32, a home mobile switching center (HMSC) 34 and a radio access network 36.

The mobile station 22 is within a coverage area 40 provided by a visitor network that is distinct from the home network 30 of the subscriber using the mobile station 22. The visitor network includes a visitor location register (VLR) 42. The VLR 42 registers the visiting subscriber using the mobile station 22 in a known manner. The mobile station 22 includes a memory portion 44 that stores an indication of a profile of the visiting mobile subscriber. In one example, the stored profile includes an indication of any wireless communication features available to the subscriber. One example profile also includes an indication of the subscriber's home network. The stored profile can be accessed by the visitor network and used for a call setup process that avoids the exchange of information with the HLR 32 for setting up a call on behalf of the visiting subscriber using the mobile station 22. The visitor network also includes a radio access network 46 and a visitor network mobile switching center (VMSC) 48.

Communications between the VLR 42 and the HLR 32 and any other portions of the networks as necessary are facilitated through a connectivity link 50 that uses SS7 signaling protocols in one example.

The example of FIG. 1 includes another mobile station 54 that is used by a subscriber whose home network is the network including the VLR 42 and VMSC 48. In one example, the subscriber using the mobile station 54 wants to call the subscriber using the mobile station 22. With the disclosed example arrangement, it is possible for the visitor network to locally setup the call between the mobile stations 54 and 22 without having to exchange information with the home network 30. Instead, in one example, the VMSC 48 accesses and utilizes the stored indication regarding the profile of the visiting subscriber from the memory portion 44 for purposes of setting up the call between the mobile stations 54 and 22.

Figure 2:
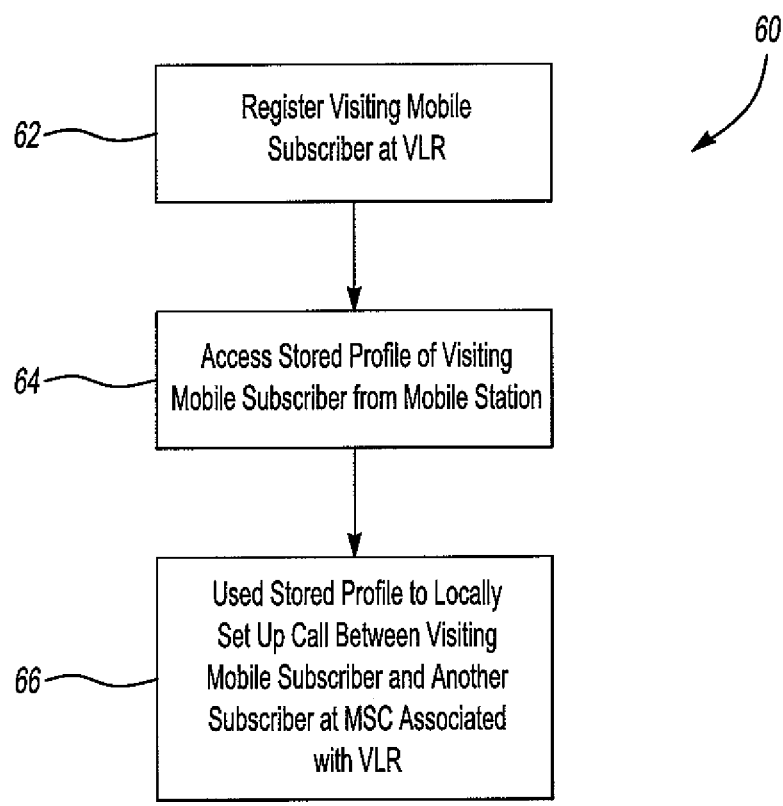
FIG. 2 is a flowchart diagram summarizing one example approach for setting up a call on behalf of a visiting mobile subscriber.

FIG. 2 includes a flowchart diagram 60 summarizing one example approach. The visiting mobile subscriber is registered at the VLR 42 in the step 62. The stored profile of the visiting mobile subscriber or at least an indication of the profile is accessed at 64. The memory portion 44 contains the indication or the stored profile so that it can be used by the VLR 42 and the VMSC 48 as may be needed. Storing the profile on the mobile station 22 in this manner eliminates the need for contacting the home network 30 for purposes of setting up a call on behalf of a visiting mobile subscriber. With this arrangement, the visitor network can locally set up a call independent of the home network. This is shown at 66 in FIG. 2 where the stored profile is used to locally setup the call between the visiting mobile subscriber and another subscriber.

In one example, the call setup is handled by the VMSC 48 without requiring communications through the connectivity link 50 and without requiring additional information from the home network 30. This presents a substantial reduction in the amount of signaling required between the VLR 42 or VMSC 48 and the home network 30 (e.g., the HLR 32 or the HMSC 34). Without requiring the connectivity link 50 for setting up the call on behalf of the visiting mobile subscriber, the disclosed example provides greater efficiencies and reduced delays. Additionally, network resources are freed up for other purposes.

In a circuit-based network, the VMSC 48 sets up the call. In a packet-based example, once the visiting mobile subscriber is registered and the profile is accessed, the packet control function (PCF) and packet data network (PDSN) of the visitor network locally facilitate the sending and receiving of a packet data session involving the mobile station 22.

In the example of FIG. 1, the VLR 42 provides an indication schematically shown at 56 that is provided to the HLR 32 as schematically shown at 58 regarding the call detail records. The HLR is identified from the indication of the stored profile regarding the subscriber's home network. This allows the HLR 32 to handle any billing to the visiting mobile subscriber and to otherwise obtain details regarding the call. The visiting network can provide the call detail records to the home network without interfering with or otherwise delaying any portion of the call involving the visiting mobile subscriber.

The disclosed example facilitates setting up a call on behalf of a visiting mobile subscriber who roams outside of the coverage area of their home network. The disclosed example eliminates the exchange of information and signaling between a visiting network and a home network for purposes of setting up a call on behalf of a previously registered visiting mobile subscriber.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of facilitating wireless communications, comprising the steps of:

registering a visiting mobile subscriber in a visitor location register of a visitor network;

using the visitor location register to access an indication of the visiting mobile subscriber profile stored on a mobile station used by the visiting mobile subscriber including an indication of any wireless communication features available to the visiting mobile subscriber; and locally setting up a call between another subscriber and the visiting mobile subscriber at the visitor network by using the accessed visiting mobile subscriber profile.

2. The method of claim 1, wherein the stored visiting mobile subscriber profile includes an indication of the visiting mobile subscriber's home network and the method comprises providing call detail records regarding the call between the visiting mobile subscriber and the other mobile subscriber to a home location register of the home network.

3. The method of claim 1, comprising locally setting up the call using a visitor mobile switching center of the visitor network.

4. The method of claim 1, comprising facilitating a packet data session call locally using a packet control function and a packet data network portion of the visitor network.

\* \* \* \* \*